United States Patent [19]
Dexter et al.

[11] 3,903,160
[45] Sept. 2, 1975

[54] AROYLAMIDO BIS- AND TRIS-(ALKYLPHENOLS)
[75] Inventors: Martin Dexter, Briarcliff Manor; Martin Knell, Ossining, both of N.Y.
[73] Assignee: Ciba-Geigy Corporation, Ardsley, N.Y.
[22] Filed: Apr. 22, 1971
[21] Appl. No.: 136,616

Related U.S. Application Data
[63] Continuation-in-part of Ser. No. 820,644, April 30, 1969, abandoned.

[52] U.S. Cl. .................... 260/559 A; 260/45.9 NC
[51] Int. Cl. ........................................... C07c 103/24
[58] Field of Search ....................... 260/558, 559, 73

[56] References Cited
UNITED STATES PATENTS
3,433,835   3/1969   Muller et al. ..................... 260/562
3,457,328   7/1969   Blatz et al. ....................... 260/562

OTHER PUBLICATIONS
Burmis Trou et al., J. Org. Chem. U.S.S.R. Vol. 1, pp. 311–312 (1965).

Primary Examiner—Harry I. Moatz
Attorney, Agent, or Firm—Nestor W. Shust

[57] ABSTRACT

Aroylamido bis- and tris(alkylphenols) can be prepared by reacting a dialkyl-4-aminophenol with a di- or tricarboxylic aromatic acid halide. The products are useful as stabilizers of organic materials subject to thermal and ultraviolet light degradation.

4 Claims, No Drawings

AROYLAMIDO BIS- AND TRIS-(ALKYLPHENOLS)

This application is a continuation in part of Ser. No. 820,644, filed Apr. 30, 1969, now abandoned.

DETAILED DESCRIPTION

The novel 4-aroylamido alkylphenol compounds of the present invention are represented by the formula

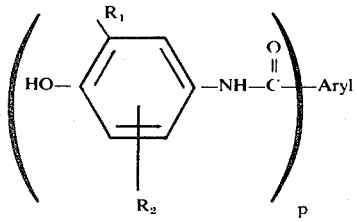

wherein $R_1$ and $R_2$ are independently lower alkyl or cycloalkyl groups, and $p$ is an integer of 2 or 3.

Lower alkyl is intended to cover groups containing from 1 to 6 carbon atoms such as, for example, methyl, ethyl, propyl, isopropyl, butyl, hexyl, and the like; cycloalkyl is intended to cover groups containing from 5 to 12 carbon atoms and illustratively cycloalkyl groups include cyclopentyl, cyclohexyl, cyclooctyl, cyclododecyl, and the like. Aryl is intended to cover aromatic hydrocarbons containing from 6 to 22 carbon atoms. Illustrative examples of such groups for the bis-compounds are o, m or p-phenylene and alkyl substituted phenulene such as tolylene, ethylphenylene, nonylphenylene, dodecylphenylene in their various isomeric forms; and for the tris-compounds s, as and v-phenenyl, methylphenenyl, ethylphenenyl, dodecylphenenyl and the like in their various isomeric forms.

The preferred alkyl groups substituted on the phenol are those having 1 to 4 carbon atoms both located in positions ortho to the hydroxyl group. Most preferably, said alkyl groups are tert-butyl. The preferred aryl group is phenylene or s-phenenyl.

The novel aroylamidoalkylphenol compounds of the present invention are prepared by reacting a suitable aminoalkylphenol with an aromatic dicarboxylic or tricarboxylic acid halide. The aminoalkylphenol starting compound is represented by the formula:

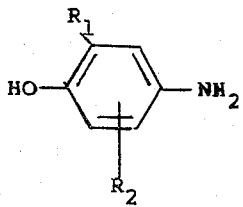

wherein $R_1$ and $R_2$ are as described above.

These aminophenols are prepared by the general procedures described in U.S. Pat. No. 3,156,690.

The aroyl halide starting compound is represented by the formula Aryl—$(COCl)_p$, wherein Aryl and p are as defined above.

The reaction is usually carried out in the presence of a non-reactive or chemically inert solvent such as methylene chloride, acetone, benzene, or any solvent in which both reactants are soluble.

Since a hydrogen halide is liberated, the reaction is usually conducted in the presence of an acid acceptor. Suitable acid acceptors include sodium hydroxide, potassium hydroxide, sodium carbonate, triethylamine, and the like.

Generally one equivalent of an aminoalkylphenol is used for each equivalent of an acid halide. However, a slight excess that is, from about 10 to about a 20% excess of the acid halide is preferred. The reaction is generally conducted at about room temperature or even below room temperature, or up to a temperature of about 100°C. The reaction is an exothermic one.

The preparation of the desired aroylamidoalkylphenol can also be suitably conducted in the absence of an acid acceptor. Under these conditions, however, a 2:1 equivalence ratio of the aminoalkylphenol to the acid halide is used.

In a typical reaction, equivalent amounts of the starting materials, that is, about 0.10 mole of the aminophenol and about 0.05 mole of a dicarboxylic aroylhalide, i.e., 4-amino-2,6-di-t-butylphenol and terephthaloyl chloride are mixed, an acid acceptor is added to the mixture and the resulting reaction mixture is maintained at about room temperature. The desired product that is, 4,4'-phthaloylamido-bis(2,6-di-t-butylphenol) is selectively recovered, washed and dried. For a tricarboxylic aroylhalide about 0.15 mole of an aminophenol would be employed.

The following examples detail the nature of the present invention and are therefore to be considered as illustrative but not limiting the invention.

EXAMPLE 1

To a solution of 11.05 g (0.05 mole) of 2,6-di-tert-butyl-4-aminophenol in 80 ml of acetone was added dropwise with stirring 5.08 g (0.025 mole) of terephthaloyl chloride. Then, 10 mil of 5 N NaOH was added slowly. The temperature rose to 45° and a precipitate formed. The slurry was stirred for 1 hour, 150 mil of water added, and filtered. The crude product was washed twice with petroleum ether, acetone and ethanol. Two grams of the crude product was stirred with 50 ml of methanol, filtered and washed with 25 ml of methanol and 20 ml of ethanol. After drying, the product, 4,4'-terephthaloylamido-bis-(2,6-di-t-butylphenol), weighed 1.52 g and melted at 360°–365°C.

Analysis Calculated for $C_{36}H_{48}N_2O_4$:
Calculated: C, 75.49; H, 8.45; N, 4.89.
Found: C, 74.74; H, 8.76; N, 4.79.

EXAMPLE 2

To a solution of 11.05 g (0.05 mole) of 2,6-di-tert-butyl-4-aminophenol in 250 ml of acetone was added dropwise with stirring 4.43 g (0.0167 mole) of trimesoyl chloride. 50 mls of 1N NaOH was then added slowly. After stirring for 2 hours, 1 liter of water was added and the crude product separated by filtration. After washing well with water, 50% acetone-water and petroleum ether a 2.1 g portion was recrystallized from 60 ml of acetone. The resulting white solid was 4,4',4''-trimesoylamido-tris(2,6-di-t-butylphenol) which melted at 326°–330°C.

Analysis Calculated for $C_{51}H_{69}N_3O_6$:
Calculated: C, 74.69; H, 8.48; N, 5.12.
Found: C, 73.67; H, 8.71; N, 4.91.

EXAMPLE 3

Similarly, using the procedure described in Example 1, there are obtained the following aroyl bis- or trisamido alkylphenols:

4,4'-terephthaloylamido-bis(2,6-dimethylphenol)
4,4'-terephthaloylamido-bis(2-t-butyl-5-methylphenol)
4,4',4''-trimesoylamido-tris(2,6-dimethylphenol)
4,4',4''-trimesoylamido-tris(2-t-butyl-5-methylphenol)

The compounds of the present invention are useful as stabilizers of organic materials normally subject to oxidative deterioration. Such organic materials include: synthetic organic polymeric substances such as vinyl resins formed from the polymerization of vinyl halides or from the copolymerization of vinyl halides with unsaturated polymerizable compounds, e.g., vinyl esters, $\alpha,\beta$-unsaturated aldehydes and unsaturated hydrocarbons such as butadienes and styrene; polyolefins such as polyethylene, polypropylene, polybutylene, polyisoprene, and the like, including copolymers of poly-$\alpha$-olefins, polyurethanes and polyamides such as polyhexamethylene adipamide and polycaprolactam; polyesters such as polymethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene and/or styrene. Other materials which can be stabilized by the active compounds of the present invention include lubricating oil of the aliphatic ester type, i.e., di(2-ethylhexyl)-azelate, pentaerythritol tetracaproate, and the like; animal and vegetable derived oils, e.g., linseed oil, fat, tallow, lard, peanut oil, cod liver oil, castor oil, palm oil, corn oil, cottonseed oil, and the like; hydrocarbon materials such as gasoline, mineral oil, fuel oil, drying oil, cutting fluids, waxes, resins, and the like, fatty acids, soaps, and the like.

The compounds of this invention are particularly effective as light stable antioxidants for polyolefins such as polypropylene and polyethylene especially when used in combination with ultraviolet light absorbers in the concentration of from 0.05 to 5% and preferably 0.1 to 2%. Illustrative examples of the UV light absorbers are as follows:

2-(3',5'-di-t-butyl-2'-hydroxyphenyl)-5-chlorobenzotriazole
2(2'-hydroxy-5'-methylphenyl)benzotriazole
2-hydroxy-4-methoxybenzophenone
2,2'-dihydroxy-4-methoxybenzophenone
2-hydroxy-4-methoxy-2'-carboxybenzophenone
2,2-dihydroxy-4-n-octoxybenzophenone
2-hydroxy-4-n-octoxybenzophenone
(2,2'-thiobis(4-t-octylphenolato)-n-butylamine nickel II
5-chloro-2-hydroxybenzophenone
2,4-dibenzoyl-resorcinol
4-tert-butyl-phenylsalicylate
phenyl salicylate
2,4-dihydroxybenzophenone
4-dodecyloxy-2-hydroxybenzophenone
p-octylphenyl salicylate
resorcinol monobenzoate
hexamethylphsphoric triamide
2-hydroxy-4-decyloxylbenzophenone
2,2'-dihydroxy-4,4'-dimethoxybenzophenone
2,2',4,4'-tetrahydroxybenzophenone
ethyl-2-cyano-3,3-diphenyl acrylate
2-ethylehexyl-2-cyano-3,3-diphenyl acrylate
2(2'-hydroxy-5'-methylphenyl)benzotriazole
2(2'-hydroxy-3',5'-di-t-butylphenyl)-7-chlorobenzotriazole
nickel acetylacetonate
dipropylene glycol salicylate
phenyl salicylate
sucrose benzoate
lauroyl-p-aminophenol
2-(2-hydroxy-3,5-di-t-amylphenyl)benzotriazole
nickel-bis[2,2'-thiobis-(4-t-octylphenol)]
nickel-bis(butyldithiocarbonate)
2-hydroxy-4-(2-hydroxy-3-methacrylyloxy)propoxybenzophenone
2-hydroxy-4-(2-hydroxy-3-acrylyloxy)propoxybenzophenone.

In general, at least one, or more of the stabilizers of the present invention are employed in amounts, in toto, of from about 0.05 to about 5% by weight of the composition containing the organic material. A particularly advantageous range of the present stabilizers for polyolefins such as polypropylene is from about 0.1% to about 2%.

For antioxidant purposes the compounds of this invention are particularly effective when used in combination with synergists. Especially useful for that purpose are di-lauryl-$\beta$-thiodipropionate and di-stearyl-$\beta$-thiodipropionate.

Furthermore, compounds of the formula:

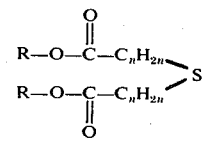

wherein $R$ is an alkyl group having from 6 to 24 carbon atoms; and $n$ is an integer from 1 to 6 are useful stabilizers in combination with the novel antioxidant compounds of the present invention.

Other antioxidants, antizonants, thermal stabilizers, ultraviolet light absorbers, coloring materials, dyes, pigments, metal chelating agents, etc., may also be used in the compositions of the invention.

It should also be mentioned that phosphite esters may also be used in stabilized formulations containing the novel antioxidants of the present invention and such phosphite compounds include dialkyl phosphites such as, for example, di-stearyl phosphite, di-lauryl phosphite, and the like, trialkyl phosphites such as, for example, trilauryl phosphite.

EXAMPLE 4

Unstabilized polypropylene powder (Hercules Profax 6501) was thoroughly blended with 0.1% by weight of 4,4'-terephthaloylamido-bis(2,6-di-t-butylphenol) and 0.3% by weight of di-stearylthiodipropionate (DSTDP). The blended material was then milled on a two roll mill for 5 minutes at 182°C. The milled sheet was compression molded at 220°C into 25 mil thick plaques under a pressure of 175 psi and water cooled in the press.

Half inch by one inch specimen cut from the 25 mil plaques was placed in a forced draft oven at 150°C. The sample was considered to have failed at the first sign of visual decomposition. This usually occurs at a corner which turns brownish and becomes brittle.

The oven life of the above sample was 130 hours. The unstabilized polypropylene has an oven life of about 3 hours and polypropylene stabilized only with 0.3% DSTDP has an oven life of about 50 hours.

EXAMPLE 5

Following the procedure of Example 4, 0.1% of 4,4',-4''-trimesoylamido-tris(2,6-di-t-butylphenol) was tested with 0.3% of DSTDP. The oven life of this composition was 190 hours.

EXAMPLE 6

4,4'-Terephthaloylamido(2,6-di-t-butylphenol), (0.2% by weight) and 2-(3',5'-di-t-butyl-2'-hydroxyphenyl)-5-chlorobenzotriazole (0.5% by weight) are dissolved in distilled methylene chloride and blended with polypropylene (Hercules Profax 6501) in a Hobart mixer. The blended material is then milled on a two-roll mill for 5 minutes at 182°C. The milled sheet is compression molded at 220°C into 5 mil thick film with a 4-cavity window frame mold. The molding is carried out 2 minutes at contact pressure and 2 minutes at 175 psi pressure. Thereafter, the samples are water cooled in the press.

The 5 mil film is mounted on a specimen mounting card having a window and capable of being inserted into an IR specotrophotometer. The card holder containing the film is exposed in the FS/BL unit and the carbonyl absorption measurement at 5.85 nm is determined periodically with an IR spectrophotometer. A sample is considered to have failed when it reaches a carbonyl absorption of 0.5 units. Polypropylene stabilized as described above is found to have a substantially longer life before failure than an unstabilized polypropylene.

EXAMPLE 7

Stabilized rubber is prepared by mixing in the cold:

| | Parts |
|---|---|
| Havea latex crepe | 100.00 |
| Stearic acid | 1.5 |
| Zinc oxide | 5.0 |
| Diphenylguanidine | 1.0 |
| Sulfur | 2.5 |
| 4,4',4''-trimesoylamido-tris(2,6-di-t-butylphenol) | 1.0 |

The resultant mixture is vulcanized at 140°C and tested according to ASTM D-1206-52T. It is found that the time required to elongate a test strip from 120 mm to 170 mm is considerably shorter for the unstabilized rubber as compared with the stabilized rubber. Similarly, styrene-butadiene rubber as well as a blend of natural rubber (50 parts) and polybutadiene rubber (50 parts) are stabilized.

EXAMPLE 8

High impact polystyrene resin containing elastomer (i.e., butadiene-styrene) is stabilized against loss of elongation properties by incorporation of 0.5% by weight of 4,4'-terephthaloylamido-bis(2-t-butyl-5-methylphenol). Under the test conditions described below, the stabilized resin retains a higher percentage of its original elongation properties, whereas the unstabilized resin retains lessened elongation properties.

The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 165°C and a pressure of 2,000 pounds per square inch into a sheet of uniform thickness (25 mil). The sheets are then cut into strips, approximately 4 × 0.5 inches. A portion of these strips is then measured for length of elongation in the Instron Tensile Tester (Instron Engineering Corporation, Quincy, Mass.). The remaining portion of the strips is aged in a forced draft oven for 6 weeks at 75°C and thereafter tested for elongation.

The invention has been described with respect to certain preferred embodiments and various modifications and variations thereof will become obvious to persons skilled in the art. It is therefore to be understood that such modifications and variations are to be included within the spirit ans scope of this invention.

We claim:

1. A compound of the formula

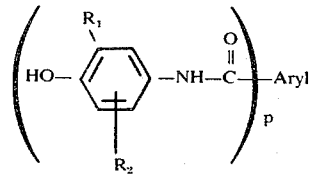

wherein
$R_1$ and $R_2$ are tert-butyl groups, $p$ is an integer of 2 or 3, and Aryl is selected from phenylene, mono alkyl substituted phenylene, phenenyl and mono alkyl substituted phenenyl group, said aryl groups having from 6 to 22 carbon atoms.

2. A compound according to claim 1 wherein said $R_1$ and $R_2$ groups are both ortho to the hydroxyl group.

3. A compound according to claim 1 which is 4,4'-terephthaloylamido-bis(2,6-di-t-butylphenol).

4. A compound according to claim 1 which is 4,4',4''-trimesoylamido-tris(2,6-di-t-butylphenol).

* * * * *